(12) United States Patent
Utagawa

(10) Patent No.: US 7,805,067 B2
(45) Date of Patent: Sep. 28, 2010

(54) FOCUS DETECTION DEVICE FOR IMAGE FORMING OPTICAL SYSTEM, IMAGING APPARATUS, AND FOCUS DETECTION METHOD FOR IMAGE FORMING OPTICAL SYSTEM

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 323 days.

(21) Appl. No.: 12/038,731

(22) Filed: Feb. 27, 2008

(65) Prior Publication Data
US 2008/0205871 A1 Aug. 28, 2008

(30) Foreign Application Priority Data
Feb. 27, 2007 (JP) .................. 2007-047526

(51) Int. Cl.
G03B 3/10 (2006.01)
G03B 13/34 (2006.01)
(52) U.S. Cl. ........................... 396/123; 348/353
(58) Field of Classification Search .......... 396/111, 396/125, 102, 121, 123; 348/349, 350, 353
See application file for complete search history.

(56) References Cited

U.S. PATENT DOCUMENTS

| | | | |
|---|---|---|---|
| 4,410,804 A | 10/1983 | Stauffer | |
| 4,417,139 A * | 11/1983 | Kusaka | 250/204 |
| 4,492,449 A | 1/1985 | Oinoue et al. | |
| 4,561,749 A | 12/1985 | Utagawa | |
| 4,580,043 A * | 4/1986 | Imai | 396/111 |
| 4,644,148 A | 2/1987 | Kusaka et al. | |
| 4,734,571 A | 3/1988 | Hamada et al. | |
| 4,766,302 A | 8/1988 | Ishida et al. | |
| 5,422,701 A | 6/1995 | Utagawa | |
| 5,572,011 A | 11/1996 | Goto | |

(Continued)

FOREIGN PATENT DOCUMENTS

DE 3320096 12/1983

(Continued)

OTHER PUBLICATIONS

Ng et al., Light Field Photography with a Hand-held Plenoptic Camera, Stanford Tech Report CTSR Feb. 2005, pp. 1-11.

*Primary Examiner*—Melissa J Koval
*Assistant Examiner*—Autumn Parker
(74) *Attorney, Agent, or Firm*—Ditthavong Mori & Steiner, P.C.

(57) ABSTRACT

A focus detection device for an image forming optical system includes a micro-lens array constituted with a plurality of two-dimensionally arrayed micro-lenses, a light-receiving element array that includes a plurality of light-receiving element s receiving a light flux from the image forming optical system via the micro-lenses, the plurality of light-receiving elements being disposed in correspondence to each micro-lens, and a focus detection unit that generates image data representing an image formed by the image forming optical system and a focus detection signal, which corresponds to a focus adjustment state at the image forming optical system, based upon signals output from the light-receiving elements at the light-receiving element array, and that detects the focus adjustment state at the image forming optical system based upon the image data and the focus detection signal.

10 Claims, 15 Drawing Sheets

U.S. PATENT DOCUMENTS

| | | |
|---|---|---|
| 6,819,360 B1 | 11/2004 | Ide et al. |
| 2005/0031330 A1* | 2/2005 | Nonaka et al. .............. 396/104 |
| 2006/0291845 A1* | 12/2006 | Sugimoto ................... 396/122 |
| 2008/0277566 A1 | 11/2008 | Utagawa |

FOREIGN PATENT DOCUMENTS

| | | |
|---|---|---|
| EP | 1887399 | 2/2008 |
| JP | 58-087512 | 5/1983 |
| JP | 59-160109 | 9/1984 |
| JP | 59-208515 | 11/1984 |
| JP | 07-199052 | 8/1995 |
| JP | 10-096852 | 4/1998 |
| JP | 2001-330769 | 11/2001 |
| JP | 2002-174766 | 6/2002 |
| JP | 2007-011314 | 1/2007 |
| WO | WO 2006/129677 | 12/2006 |

* cited by examiner

OPERATION MEMBER  CONTROL CIRCUIT
CALCULATION CIRCUIT
FOCUS DETECTION SENSOR
FOCUS DETECTION OPTICAL SYSTEM

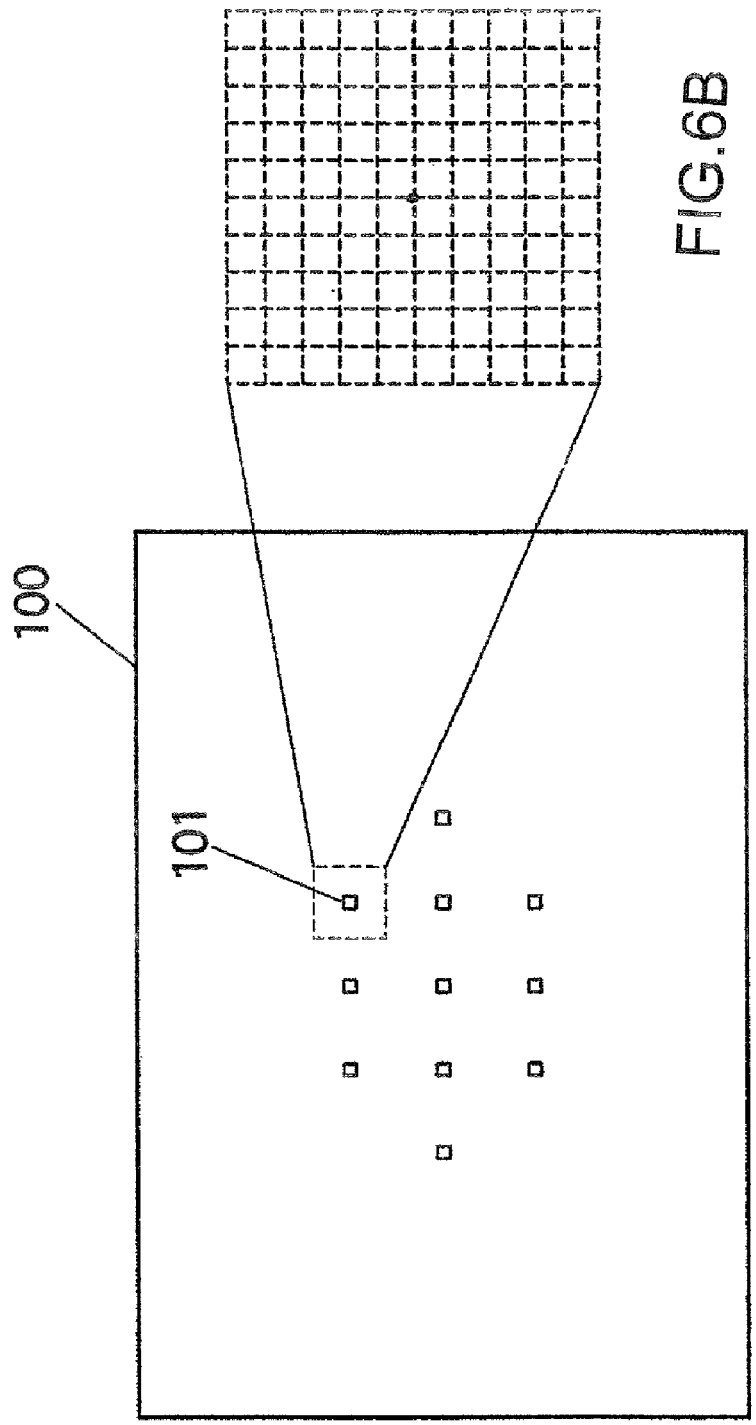

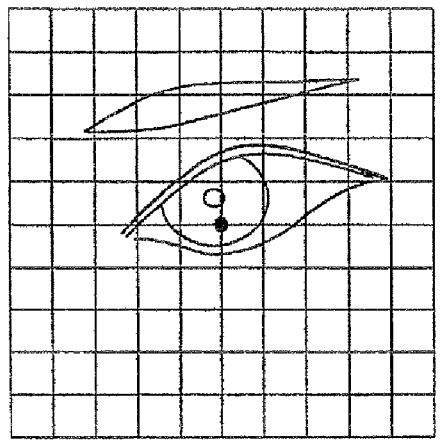
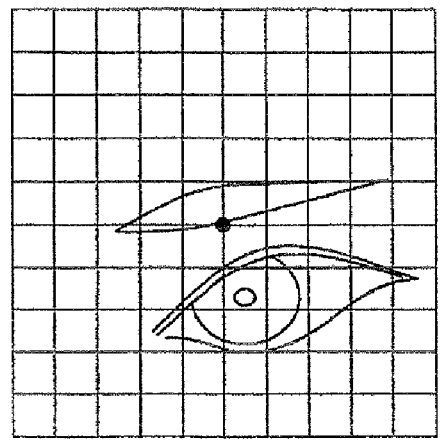
FIG.12A    FIG.12B
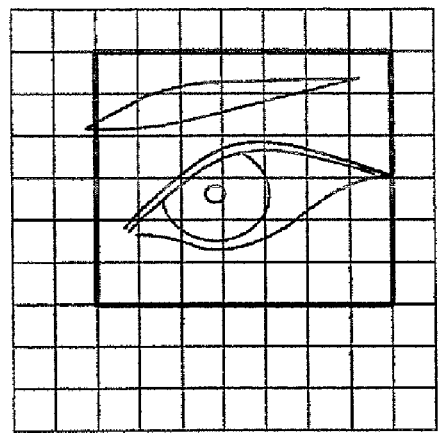
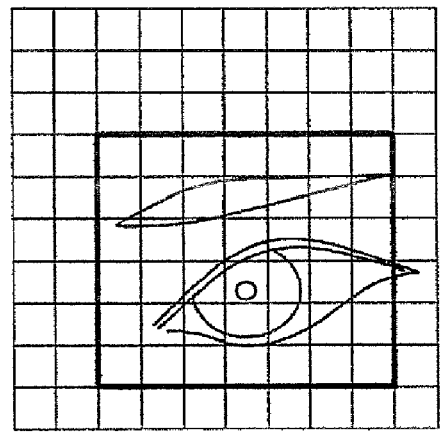
FIG.12C    FIG.12D 301b' / 302b' \ 303b'
301a'  302a'  303a'

301a' 302b' 302a' 303b' 303a'
301b'

301a / 302a \ 303a
301b  302b  303b

FOCUS DETECTION DEVICE FOR IMAGE FORMING OPTICAL SYSTEM, IMAGING APPARATUS, AND FOCUS DETECTION METHOD FOR IMAGE FORMING OPTICAL SYSTEM

INCORPORATION BY REFERENCE

The disclosure of the following priority application is herein incorporated by reference:

Japanese Patent Application No. 2007-047526 filed Feb. 27, 2007

BACKGROUND OF THE INVENTION

1. Field of the Invention

The present invention relates to a focus detection device for an image forming optical system, an imaging apparatus, and a focus detection method for an image forming optical system.

2. Description of Related Art

Japanese Laid Open Patent Publication No. 2007-011314 discloses an image forming state detection device that includes two-dimensionally arrayed micro-lenses with a plurality of light-receiving elements (photoelectric conversion units) disposed in correspondence to each micro-lens. This image forming state detection device extracts a pair of signal strings corresponding to images formed with light fluxes having passed through different areas on pupil of the image forming optical system based upon light reception outputs obtained at the plurality of light-receiving elements. The image forming state detection device then determines the image forming state at the image forming optical system by detecting an offset between the phases of the signal string pair having been extracted.

SUMMARY OF THE INVENTION

However, a method that may be adopted when selecting a focus detection area is not discussed in relation to the image forming state detection device in the related art described above.

A focus detection device for an image forming optical system according to the present invention comprises a micro-lens array constituted with a plurality of two-dimensionally arrayed micro-lenses; a light-receiving element array that includes a plurality of light-receiving element s receiving a light flux from the image forming optical system via the micro-lenses, the plurality of light-receiving elements being disposed in correspondence to each micro-lens; and a focus detection unit that generates image data representing an image formed by the image forming optical system and a focus detection signal, which corresponds to a focus adjustment state of the image forming optical system, based upon signals output from the light-receiving elements at the light-receiving element array, and that detects the focus adjustment state of the image forming optical system based upon the image data and the focus detection signal.

It is desirable that the focus detection unit in the focus detection device for the image forming optical system described above sets a focus detection area on a photographic image plane of the image forming optical system and generates a focus detection signal corresponding an extent of shift between images formed with a pair of light fluxes having passed through different portions of pupil at the image forming optical system based upon output signals from the plurality of light-receiving elements corresponding to the micro-lenses in an area corresponding to a position of the focus detection area.

The focus detection unit may detect a characteristic feature of the image and sets the focus detection area at a position within the photographic image plane corresponding to a position at which the characteristic feature is detected. The focus detection unit may set the focus detection area near a focus detection area set in advance within the photographic image plane of the image forming optical system.

The focus detection unit may detect contrast in the image and set the focus detection area at a position within the photographic image plane where the contrast is represented by a value equal to or greater than a predetermined value.

Alternatively, it is desirable that the focus detection unit detects a contrast manifesting along a first direction in the image and sets the focus detection area at a position within the photographic image plane where the contrast is represented by a value equal to or greater than the predetermined value. Furthermore, the focus detection unit may detect contrast manifesting along a second direction different from the first direction in the image and sets the focus detection area at a position within the photographic image plane where the contrast is represented by a value equal to or greater than the predetermined value.

It is desirable that the focus detection unit, having set the focus detection area by detecting a first characteristic feature of a first image generated based upon signals output from the light-receiving elements at a first time point, detects a second characteristic feature of a second image generated based upon signals output from the light-receiving elements at a second time point and adjusts the position of the focus detection area to a position corresponding to a position at which the second characteristic feature contains characteristics identical to the characteristics of the first characteristic feature.

It is desirable that the focus detection unit of the focus detection device for the image forming optical system according to the present invention generates the image data by selectively using output signals obtained from the plurality of light-receiving elements corresponding to each micro-lens.

A focus detection device for an image forming optical system in another mode of the present invention comprises a micro-lens array constituted with a plurality of two-dimensionally arrayed micro-lenses; a light-receiving element array that includes a plurality of light-receiving element s receiving a light flux from the image forming optical system via the micro-lenses, the plurality of light-receiving elements being disposed in correspondence to each micro-lens; and a focus detection unit that detects a characteristic feature of an image data representing a two-dimensional image formed by the image forming optical system, generates a focus detection signal, which indicates a focus adjustment state of the image forming optical system, based upon signals output from the light-receiving elements corresponding to a position at which the characteristic feature of the image is detected, and that detects the focus adjustment state of the image forming optical system based upon the focus detection signal.

An imaging apparatus according to the present invention comprises an image sensor that receives a light flux from an image forming optical system; a micro-lens array constituted with a plurality of two-dimensionally arrayed micro-lenses; a light-receiving element array that includes a plurality of light-receiving element s receiving a light flux from the image forming optical system via the micro-lenses, the plurality of light-receiving elements being disposed in correspondence to each micro-lens; and a focus detection unit that detects a characteristic feature of an image data representing a two-dimensional image formed by the image forming optical system, generates a focus detection signal, which indicates a focus adjustment state of the image forming optical system, based upon signals output from the light-receiving elements corresponding to a position at which the characteristic feature of the image is detected, and that detects the focus adjustment state of the image forming optical system based upon the focus detection signal.

A focus detection method for an image forming optical system according to the present invention, comprises: providing a micro-lens array constituted with a plurality of two-dimensionally arrayed micro-lenses; a light-receiving element array that includes a plurality of light-receiving element s receiving a light flux from the image forming optical system via the micro-lenses, the plurality of light-receiving elements being disposed in correspondence to each micro-lens; generating image data representing an image formed by the image forming optical system and a focus detection signal, which corresponds to a focus adjustment state of the image forming optical system, based upon signals output from the light-receiving elements at the light-receiving element array, and detecting the focus adjustment state of the image forming optical system based-upon the image data and the focus detection signal.

It is desirable that the focus detection method, further comprises setting a focus detection area on a photographic image plane of the image forming optical system, wherein the focus detection signal is generated as a signal corresponding an extent of shift between images formed with a pair of light fluxes having passed through different portions of pupil at the image forming optical system based upon output signals from the plurality of light-receiving elements corresponding to the micro-lenses in an area corresponding to a position of the focus detection area It is desirable that the focus detection method further comprises detecting a characteristic feature of the image, and setting the focus detection area at a position within the photographic image plane corresponding to a position at which the characteristic feature is detected.

It is desirable that in the focus detection method the focus detection area is set near a focus detection area set in advance within the photographic image plane of the image forming optical system.

A focus detection method for detecting a focus state of an image formed by a forming optical system in another mode of the present invention, comprises: providing a micro-lens array constituted with a plurality of two-dimensionally arrayed micro-lenses; and a light-receiving element array that includes a plurality of light-receiving element s receiving a light flux from the image forming optical system via the micro-lenses, the plurality of light-receiving elements being disposed in correspondence to each micro-lens, detecting a characteristic feature of an image data representing a two-dimensional image formed by the image forming optical system; generating a focus detection signal, which indicates a focus adjustment state at the image forming optical system, based upon signals output from the light-receiving elements corresponding to a position at which the characteristic feature of the image is detected; and detecting the focus adjustment state at the image forming optical system based upon the focus detection signal.

BRIEF DESCRIPTION OF THE DRAWINGS

FIG. 6A presents an example of focus detection areas that may be set within the photographic image plane and FIG. 6B shows a specific image range centered on a focus detection area;

FIGS. 12A through 12D illustrate a method that may be adopted when setting the focus detection area in correspondence to the movement of the subject;

DESCRIPTION OF PREFERRED EMBODIMENT

An embodiment by adopting the present invention in a digital single lens reflex camera is described below. It is to be noted that the application of the present invention is not limited to digital single lens reflex cameras and it may be adopted in any type of imaging apparatus at which focal adjustment is executed for the photographic lens.

Figure 1:
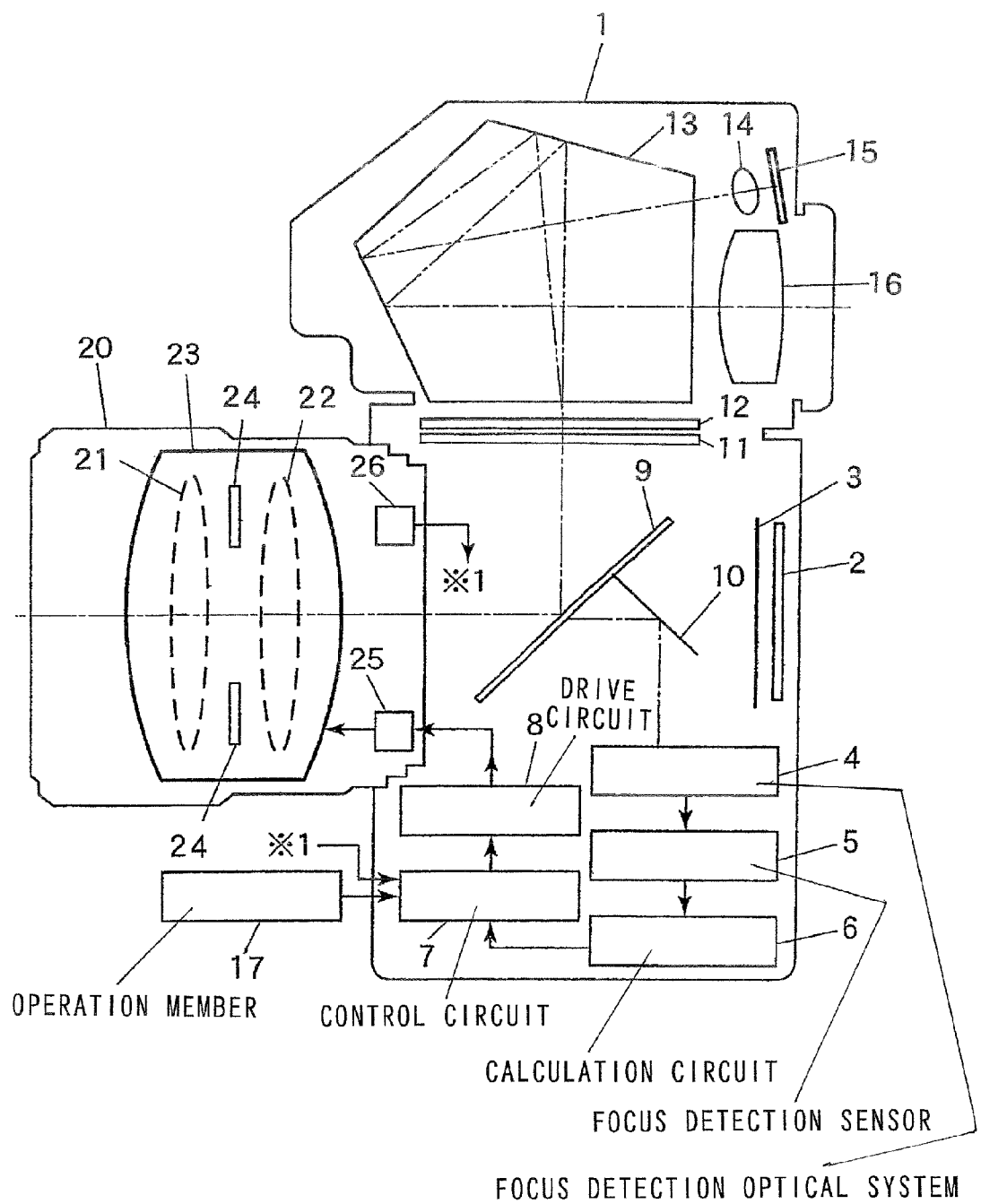
FIG. 1 is a lateral sectional view of a digital single lens reflex camera equipped with the focus detection device in an embodiment.

FIG. 1 is a lateral sectional view showing the structure of a digital single lens reflex camera equipped with the focus detection device in an embodiment. It is to be noted that an illustration and an explanation of standard components and devices in the camera, which do not bear direct relevance to the focus detection device and the imaging apparatus according to the present invention, are omitted. At a camera in the embodiment, a lens barrel 20 is interchangeably mounted at a camera body 1. It is to be noted that while an explanation is given in reference to the embodiment on an example in which the present invention is adopted in the camera that allows the use of an interchangeable lens, the present invention is not limited to applications in cameras with interchangeable lenses and may also be adopted in a camera with a fixed lens.

At the camera body 1, an image sensor 2, a shutter 3, a focus detection optical system 4, a focus detection sensor 5, a calculation circuit 6, a camera control circuit 7, a drive circuit 8, a quick-return mirror 9, a sub-mirror 10, a viewfinder screen 11, a transmission type liquid crystal display unit 12, a pentaprism 13, a photometering lens 14, a photometering sensor 15, an eyepiece lens 16, an operation member 17 and the like are disposed.

The image sensor 2, constituted with a CCD, a CMOS or the like, converts a subject image formed through an imaging lens 23 disposed within the lens barrel 20 to electrical signals and outputs the signals resulting from the conversion. As a shutter button (not shown) is pressed all the way down (at the time of a shutter release), the shutter 3 is released over a length of time matching a shutter speed set based upon exposure calculation results or set by the photographer manually, so as to expose the image sensor 12 with light passing through the shutter 3. The focus detection optical system 4, the focus detection sensor 5 and the calculation circuit 6 for focus detection constitute a focus detection device adopting a phase difference detection method that detects a defocus amount indicating the focal adjustment state at the photographic lens (image forming optical system) 23. The components 4, 5 and 6 constituting the focus detection device are to be described in detail later.

The camera control circuit 7, constituted with a microcomputer and its peripheral components such as a memory (none shown), controls sequences including a photometering sequence, a focus detection sequence and a photographing sequence, as well as arithmetic operations such as the exposure calculation. The drive circuit 8 controls drive of a lens/aperture drive actuator 25 disposed within the lens barrel 20. The photometering sensor 15 outputs a photometering signal corresponding to the brightness in each of a plurality of areas defined by dividing the photographic image plane.

At the lens barrel 20, a focusing lens 21, a zooming lens 22, an aperture 24, the lens/aperture drive actuator 25, a lens memory 26 and the like are disposed. It is to be noted that FIG. 1 shows a single photographic lens 23 representing both the focusing lens 21 and the zooming lens 22. As the focusing lens 21 is driven along the optical axis by the actuator 25, the focus of the photographic lens 23 is adjusted. As the zooming lens 22 is driven along the optical axis by the actuator 25, the focal length of the photographic lens 23 is adjusted. As the aperture 24 is driven by the actuator 25, the aperture opening diameter is altered. In the lens memory 26, information related to the photographic optical system, such as the F value and the focal length of the photographic lens 23, is stored.

The operation member 17 operated by the photographer is disposed at the camera body 1 and the lens barrel 20. The operation member 17 includes a shutter release halfway press switch which enters an ON state when the shutter button is pressed halfway down and a shutter release full press switch which enters an ON state when the shutter button is pressed all the way down.

As shown in FIG. 1, the quick return mirror 9 and the sub-mirror 10 are set within the photographic light path in a non-photographing state. In this state, part of the light from the subject, having been transmitted through the photographic lens 23, is reflected at the quick return mirror 9 and is guided to the viewfinder screen 11 to form a subject image on the screen 11. The transmission type liquid crystal display unit 12 displays focus detection area marks by superimposing them over the subject image on the screen 11 and also displays photographic information such as the shutter speed, the aperture value and the number of pictures.

The subject image on the screen 11 is guided toward the photographer's eye via the pentaprism 13 and the eyepiece lens 16 and is also guided to the photometering sensor 15 via the pentaprism 13 and the photometering lens 14. The camera control circuit 7 executes exposure calculation based upon photometering signals output from the photometering sensor 15 in correspondence to individual photometering areas so as to calculate the shutter speed and the aperture value in correspondence to the brightness in the photographic field. It is to be noted that a photographing operation is executed based upon the shutter speed and the aperture value set by the photographer by operating the operation member 17 in a manual exposure photographing mode.

Another portion of the light from the subject having passed through the photographic lens 23 is transmitted through the quick return mirror 9, is reflected at the sub-mirror 10 and is guided to the focus detection sensor 5 via the focus detection optical system 4. In the embodiment, focus detection areas are set at a plurality of positions within the photographic image plane. The focus detection sensor 5 is an image sensor that includes a plurality of photoelectric conversion elements disposed in a two-dimensional array and calculation areas for focus detection are set each in correspondence to the focus detection area at a light receiving plane of the sensor. Accordingly, as one of the focus detection areas is selected, focus detection signals indicating the focal adjustment state of the photographic lens 23 are output from the plurality of photoelectric conversion elements present within the corresponding focus detection calculation area. The calculation circuit 6 for focus detection calculates a defocus amount indicating the focal adjustment state of the photographic lens 23 based upon the focus detection signals output from the calculation area set in correspondence to the specific focus detection area. The camera control circuit 7 calculates the lens drive quantity based upon the defocus amount and drives the actuator 25 via the drive circuit 8 so as to drive the focusing lens 21 to the focus match position.

In the photographing state, the quick return mirror 9 and the sub-mirror 10 are made to retreat from the photographic light path (mirror up), the shutter 3 is released and the light flux from the subject having been transmitted through the photographic lens 23 is guided to the image sensor 2 enabling the image sensor 2 to capture the image.

In reference to FIGS. 14 and 15, an explanation will be given for problems to be addressed in a focus detection device at which calculation areas are set relatively sparsely and do not have a significant width. A high contrast area of the focusing target subject cannot be captured with ease over a calculation area with this type of focus detection device.

Figure 14:
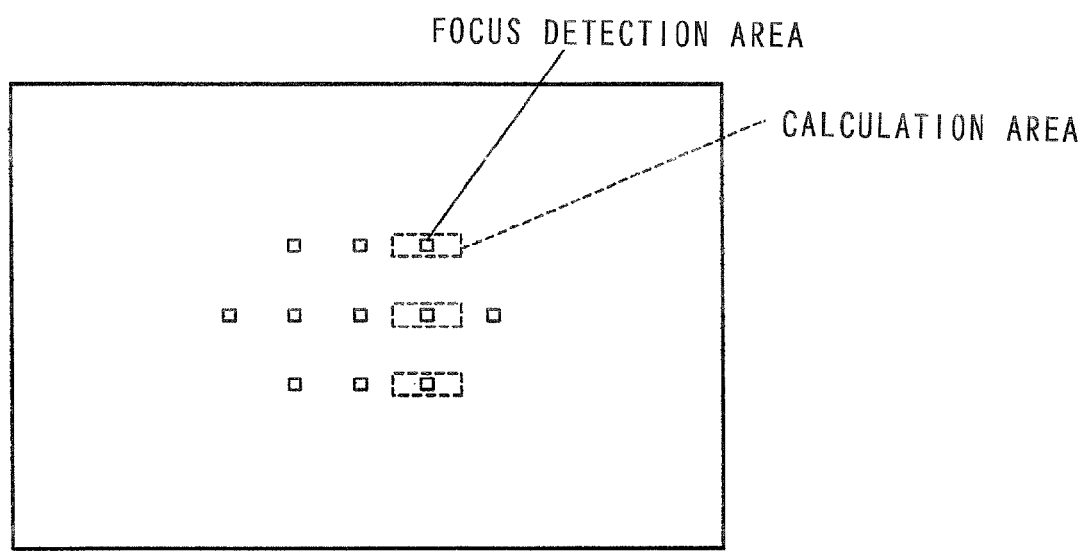
FIG. 14 shows focus detection areas set within the photographic image plane and focus detection area marks indicating their positions.
Figures 15A, 15B, 15C:
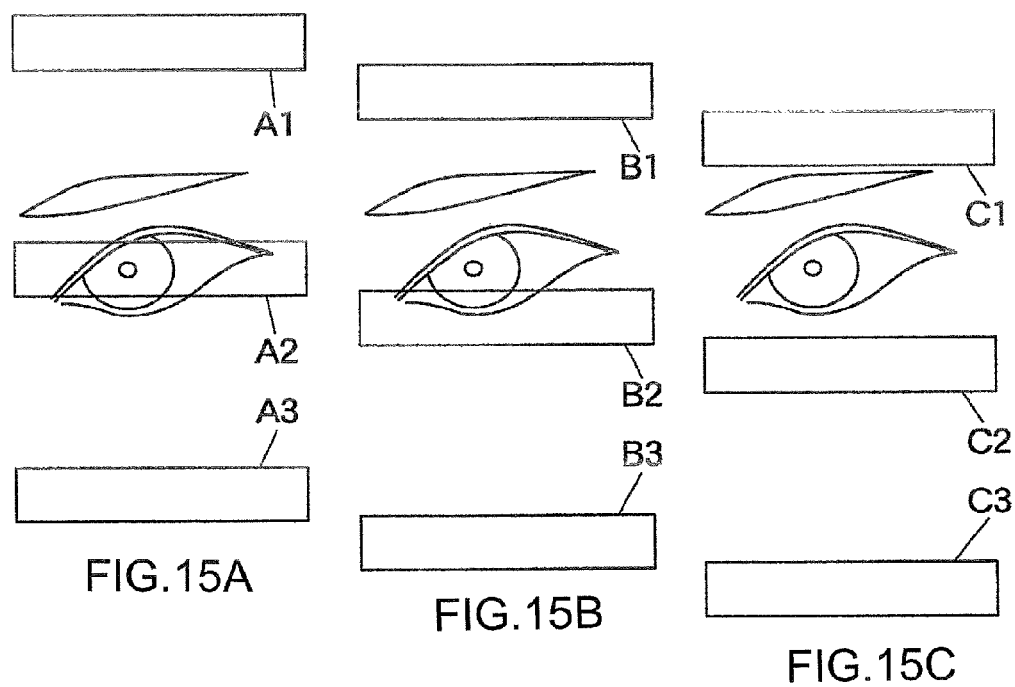
FIG. 15A through 15C illustrate how the subject may be captured in a focus detection area at a focus detection device with focus detection areas set at discrete positions.

FIG. 14 shows the calculation areas set within the photographic image plane and focus detection area (marks) indicating their positions. In the example presented in the figure, eleven focus detection areas are set within the photographic image plane with the marks superimposed over the subject image at the viewfinder internal display unit to indicate the positions of the focus detection areas. An explanation is given by assuming that focus detection is executed by capturing a human subject's eye area over a middle calculation area A2 among the three calculation areas set along the longitudinal direction on the right side of the image plane, as shown in FIG. 15A. While the calculation areas are not set densely and do not have a significant width, a highly accurate focus detection can be executed as long as a high contrast area such as an eye can be captured. However, if the subject moves even slightly, as shown in FIG. 15 B, the high contrast eye area becomes offset to an end of the calculation area, lowering the focus detection accuracy. If the high contrast portion becomes offset to an even greater extent, the eye area moves out of the calculation area, as shown in FIG. 15, with a low contrast skin area captured over the calculation area, greatly lowering the focus detection accuracy or even disabling focus detection.

In order to solve the problem of the focus detection device in the related art described above, the focus detection optical system 4 is constituted with a micro-lens array with a plurality of two-dimensionally arrayed micro-lenses, the focus detection sensor 5 is constituted with a light-receiving element array that receives a light flux from the photographic lens 23 via the micro-lenses, with a plurality of light-receiving elements disposed in correspondence to each micro-lens, subject image data and focus detection signals are generated based upon signals output from the focus detection sensor (light-receiving element array) 5, and the focal adjustment state at the photographic lens 23 is detected based upon the image data and the focus detection signals in the embodiment. In the embodiment, the focus detection sensor 5, constituted with a light-receiving element array is used to generate subject image data that is different from focus detection signals, a portion of the image data, which enables optimal focus detection, is detected, and both the reliability and the accuracy of the focus detection are improved by allowing a calculation area to be set at any position within the image plane.

Figure 2:
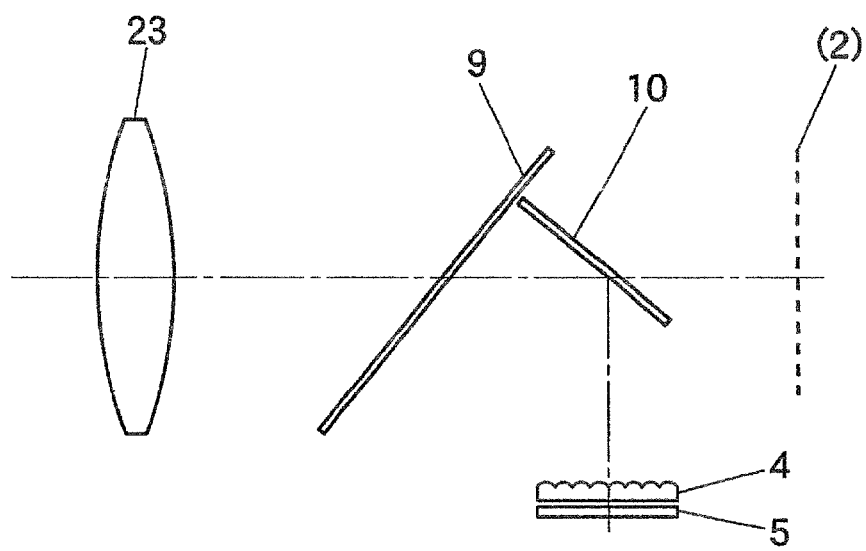
FIG. 2 shows in detail the focus detection optical system and the focus detection sensor.
Figure 3:
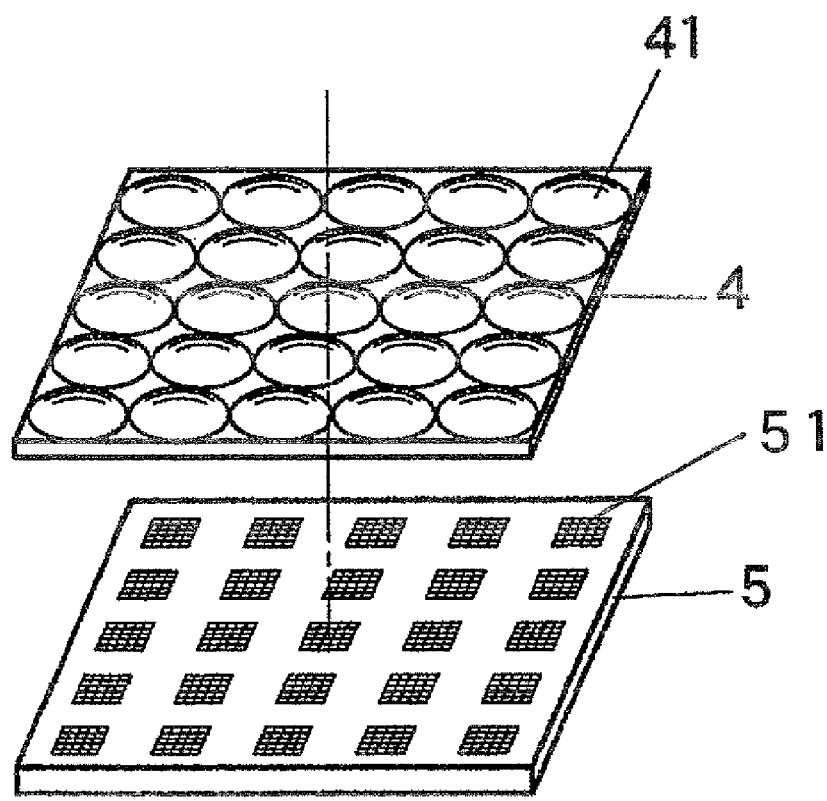
FIG. 3 shows in detail the focus detection optical system and the focus detection sensor.

FIGS. 2 and 3 show in detail the focus detection optical system 4 and the focus detection sensor 5. The focus detection optical system 4 in the figures is a micro-lens array constituted with a plurality of two-dimensionally arrayed micro-lenses 41, and is disposed near a plane at which the focus of the photographic lens 23 is to be adjusted, i.e., the plane assuming a conjugate position relative to the imaging plane of the imaging sensor 2. It is to be noted that while FIGS. 2 and 3 show a small number of micro-lenses, the micro-lenses are actually arrayed with a pitch equal to or less than 100μ. This means that assuming that the micro-lens array ranges over, for instance, a 5 mm×5 mm area, the number of micro-lenses disposed therein will be extremely large.

The focus detection sensor 5 is a light-receiving element array constituted with a plurality of two-dimensionally arrayed light-receiving elements (photoelectric conversion elements) 51, which is disposed to the rear of the focus detection optical system (micro-lens array) 4. It is to be noted that while FIG. 3 shows a light-receiving element array with 25 light-receiving elements (5 down×5 across) disposed in a square array in correspondence to each micro-lens, the number of light-receiving elements to be disposed in correspondence to each micro-lens is not limited to this example. In addition, instead of a discrete array with a plurality of light-receiving elements disposed in correspondence to each micro-lens, a light-receiving element array constituted with a plurality of light-receiving elements uniformly disposed in a two-dimensional array may be used as the focus detection sensor.

The light flux from the subject is transmitted through the quick return mirror 9, reflected at the sub-mirror 10 and guided to the focus detection sensor (light-receiving element array) via the focus detection optical system (micro-lens array) 4.

Figure 4A:
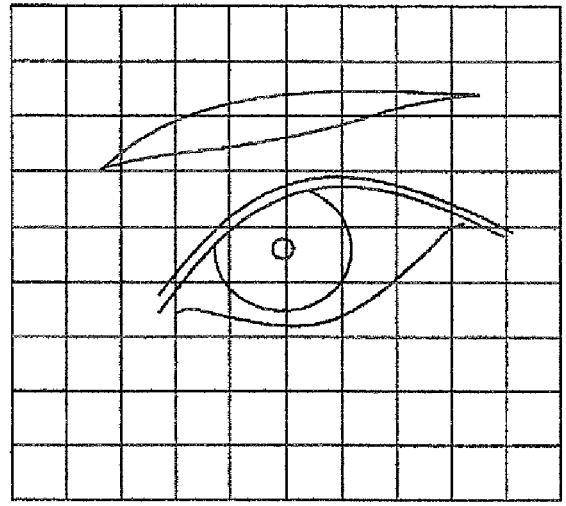
FIG. 4A shows a two-dimensional image.
Figure 4B:
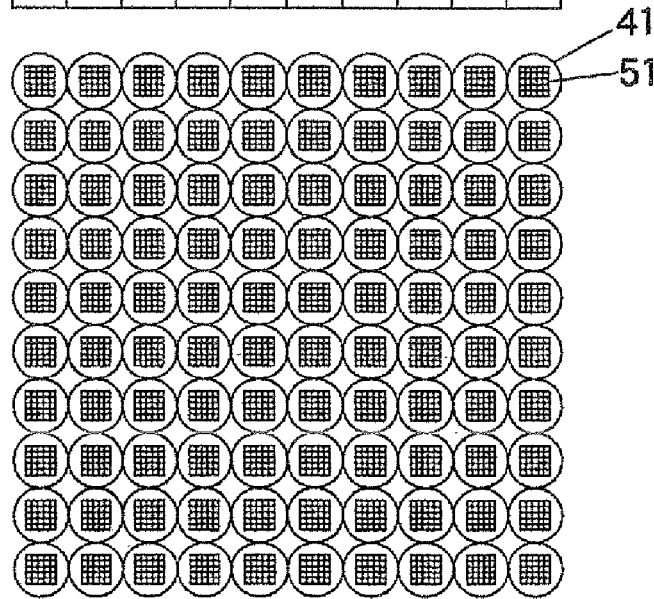
FIG. 4B is a front view of the focus detection optical system and the focus detection sensor and FIG. 4C is a sectional view of the focus detection optical system and the focus detection sensor.
Figure 4C:
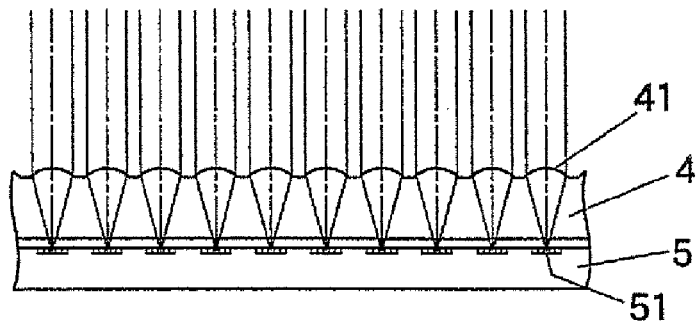

FIG. 4B shows the focus detection optical system 4 and the focus detection sensor 5 viewed from the side where the photographic lens 23 is present, where as FIG. 4C shows the focus detection optical system 4 and the focus detection sensor 5 in a lateral sectional view. A two-dimensional image such as that shown in FIG. 4A is obtained by extracting signals from the focus detection sensor, each output from a light-receiving element assuming the central position among the 25 light-receiving elements corresponding to a given micro-lens 41, and setting the extracted outputs in conformance to the micro-lens layout at the micro-lens array (focus detection optical system) 4. FIG. 4A shows an image of the subject's eye area. It is to be noted that FIG. 4C illustrates how the light flux received at the central light-receiving element among the 25 light-receiving elements corresponding to each micro-lens 41 expands.

Instead of the output from the central light-receiving elements, a value representing the sum of the outputs from a plurality of light-receiving elements may be extracted as the light-receiving element output in correspondence to each micro-lens to be used to generate the two-dimensional image. For instance, the value representing the sum of the outputs from nine light-receiving elements (3 down×3 across) may be used. Better focus detection capability can be assured when the subject is dark by the sum of the outputs from a greater number of light-receiving elements.

(Calculation Circuit 6)

Figure 5:
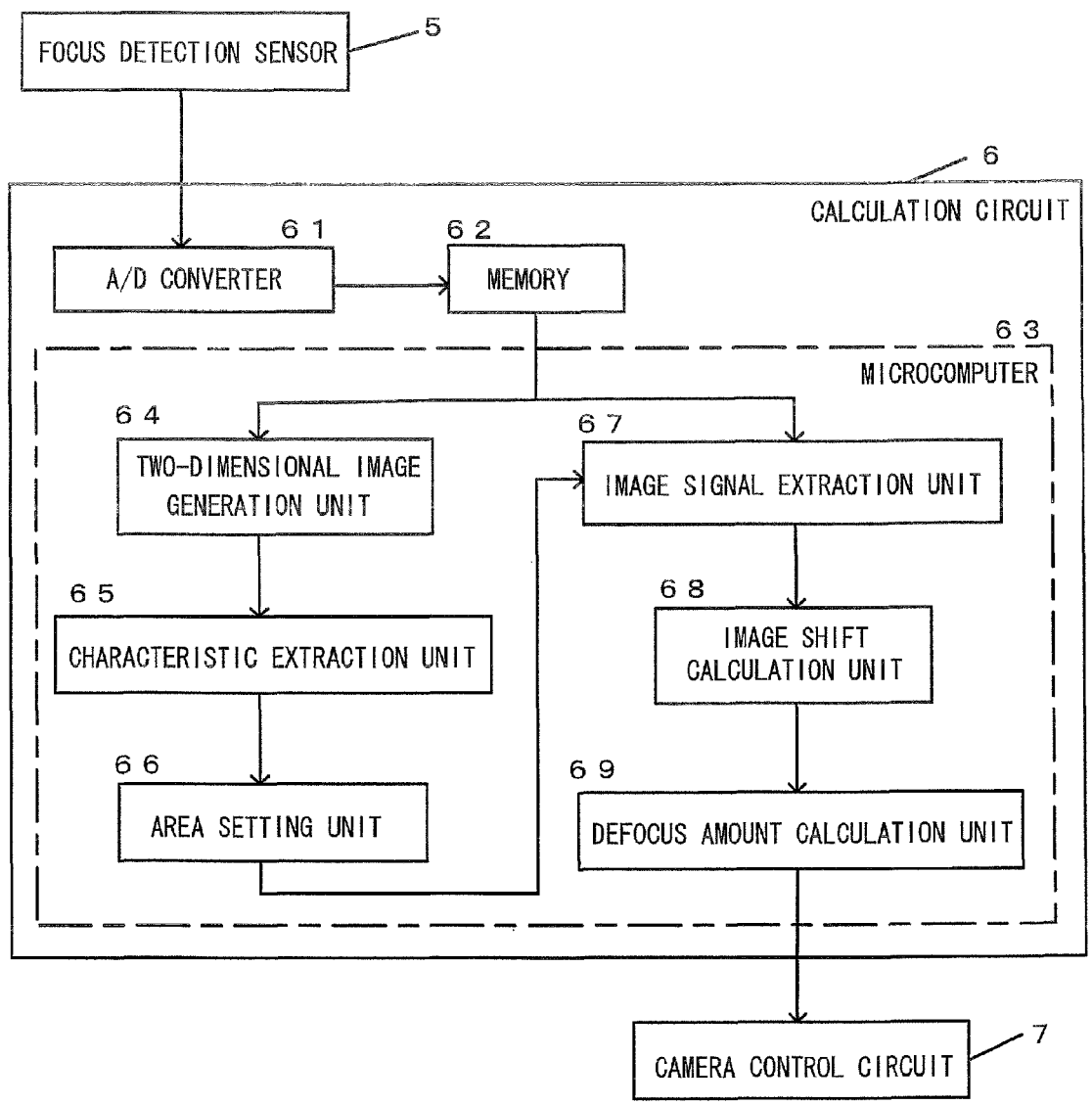
FIG. 5 shows in detail the structure adopted in the calculation circuit.

FIG. 5 shows in detail the structure adopted in the calculation circuit 6. The calculation circuit 6 includes an A/D converter 61, a memory 62 and a microcomputer 63. At the microcomputer 63, a two-dimensional image generation unit 64, a characteristic extraction unit 65, an area setting unit 66, an image signal extraction unit 67, an image shift calculation unit 68 and a defocus amount calculation unit 69 are configured in software.

The outputs from all the light-receiving elements 51 at the focus detection sensor (light-receiving element array) 5 are readout sequentially and are converted to digital signals at the A/D converter 61. The digital signals resulting from the conversion are then stored into the memory 62. It is to be noted that as described in detail later, if a specific focus detection area has been selected, the light-receiving element outputs within a specific range centered on the selected focus detection area alone are selectively read out.

(A Two-Dimensional Image Generation Unit 64)

The two-dimensional generation unit 64 creates a two-dimensional image such as that shown in FIG. 4A by arranging the outputs from the central light-receiving elements under the micro-lenses present within a specific range centered on a focus detection area among the light-receiving element outputs from the focus detection sensor 5 having been stored into the memory 62.

As shown in FIG. 6A, eleven focus detection areas are set within the photographic image plane 100 of the photographic lens 23 and a liquid crystal display unit 12 mentioned earlier displays marks 101 indicating the positions of the eleven focus detection areas by superimposing the marks 101 over the subject image on the viewfinder screen 11. As the focus detection area indicated by the upper right mark 101 in the photographic image plane 100 is selected, for instance, a specific image range centered on the selected focus detection area (indicated by the filled dot) is set as shown in FIG. 6B and a two-dimensional image is generated by arranging the outputs from the central light-receiving elements under the micro-lenses within this image range.

Figure 7A:
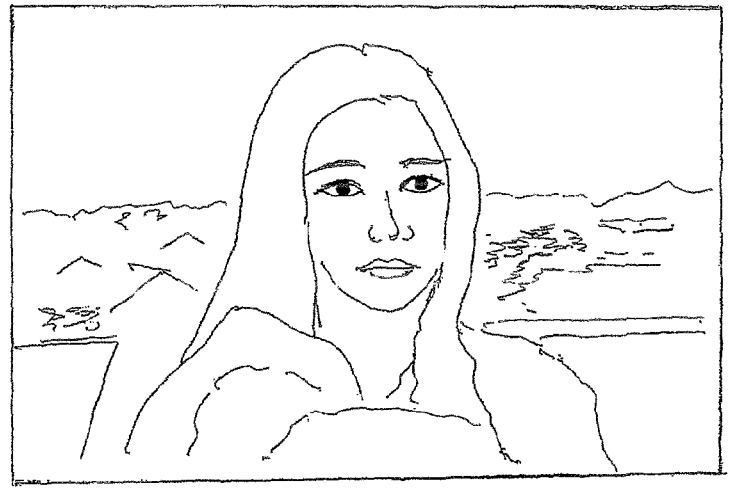
FIG. 7A presents an example of a two-dimensional image.
Figure 7B:
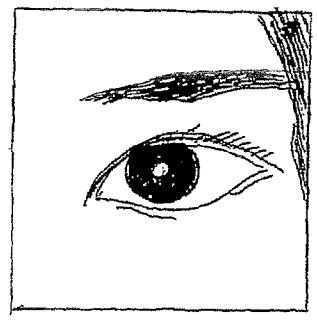
FIG. 7B shows a specific image range centered on the selected focus detection area.
Figure 7C:
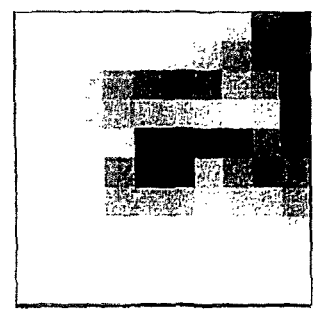
FIG. 7C presents an example of two-dimensional image data generation and FIG. 7D presents an example of fine two-dimensional image generation.

More specifically, as a specific image range (see FIG. 7B), centered on the selected focus detection area at the upper right position in the subject image shown in FIG. 7A is set, two-dimensional image data shown in FIG. 7C are generated by arranging the outputs from the central light-receiving elements corresponding to the micro-lenses present within this image range. It is to be noted that in the description of the embodiment, components constituting the two-dimensional image shown in FIGS. 6B and 7C are referred to as "pixels" with V (i, j) indicating a brightness value at each pixel (i indicates the number assigned to the row in which the subject pixel is disposed and j indicates the number assigned to the column in which the subject pixel is disposed).

(Characteristic Extraction Unit 65)

Figure 8E:
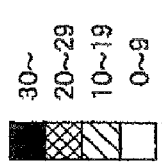
FIGS. 8A through 8E illustrate the processing executed to extract characteristic points from a two-dimensional image.
Figure 8B:
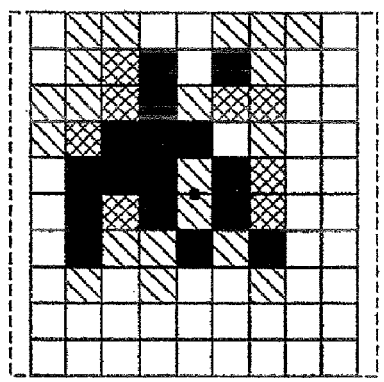
Figure 8D:
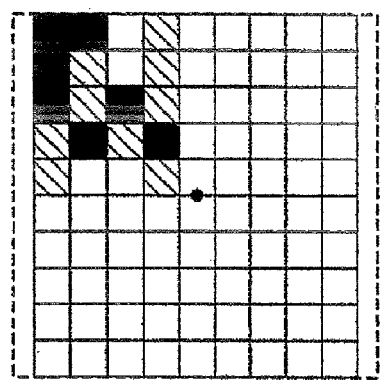
Figure 8A:
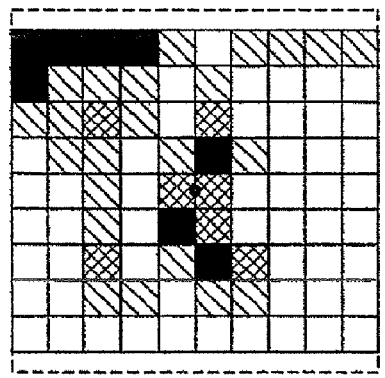

The characteristic extraction unit 65 calculates the difference between brightness levels at pixels along a first direction (row direction), i.e., contrast manifesting along the first direction, in the two-dimensional image generated by the two-dimensional image generation unit 64. FIG. 8A shows the contrast Ch (i, j) manifesting at the subject pixel relative to the pixel adjacent to it along the lateral direction of the two-dimensional image V(i, j) in FIG. 7c, which is determined as indicated in (1) below and classified into one of the four different contrast levels shown in FIG. 8E.

$$Ch(I,j) = |V(I,j) - V(i+1,j)| \quad (1)$$

In the embodiment, a contrast range of 0 through 255 is assumed for the pixels and a contrast level Ch (i, j) ($\geq$Cho), which is equal to or greater than a predetermined value Cho (e.g., 30) is indicated by a filled square. The filled areas in FIG. 8A each represent a "characteristic point" in the two-dimensional image V (i, j) shown in FIG. 7C. It is to be noted that a characteristic point in the image may be determined through a method other than the method adopted in the embodiment, as long as a quantity related to contrast is detected.

(Area Setting Unit 66)

Figure 9A:
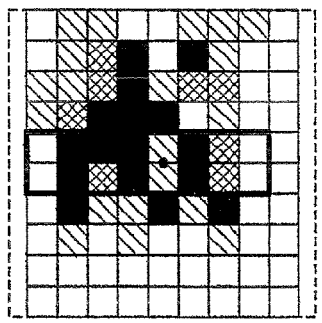
FIGS. 9A through 9D illustrate a method that may be adopted when setting a focus detection area based upon characteristic points of the two-dimensional image.

The area setting unit 66 selects three characteristic points (or a single characteristic point or two characteristic points) close to the selected focus detection area (indicated by the filled dot in the figure) among the plurality of filled characteristic points in FIG. 8A and sets a calculation area centered on the selected characteristic points. FIG. 9A shows an example of a calculation area set around the three characteristic points (filled pixels) close to the focus detection area indicated by the filled dot.

Generally speaking, it is desirable to set a calculation area which is elongated along the first direction, i.e., a lateral (row) direction. In the calculation area shown in FIG. 9A, three characteristic points are present along the first direction (lateral direction) and, accordingly, it is desirable to detect the image shift along this direction. It is to be noted that the contrast changes significantly along diagonal directions with angles of inclination up to 45° relative to the first direction and thus, a calculation area may be set along a 45° angle diagonal direction relative to the first direction or along a diagonal direction with the angle of inclination thereof within a range of 0 to 45°.

Figure 8C:
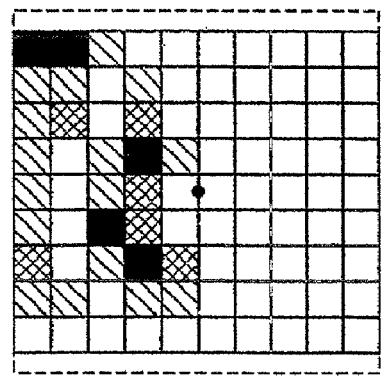
Figure 9B:
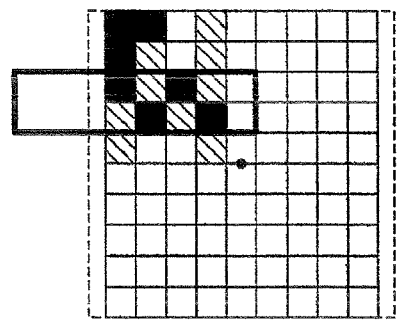
Figure 9C:
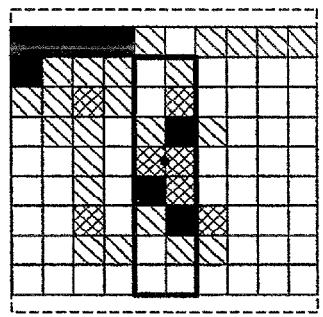

FIG. 8A presents an example in which characteristic points are present near a specific position indicated by the filled dot, i.e., near the selected focus detection area in this case. If characteristic points are present at positions slightly distanced from the focus detection area, as in the example presented in FIG. 8C, the area setting unit 66 may set a calculation area as shown in FIG. 9C. Through the processing described above, a calculation area centered on a high contrast image portion can be set without fail.

As long as the subject has a vertical stripe image structure, a calculation area set as described above can be used for successful focus detection. However, in order to ensure that an optimal calculation area is set when the subject assumes a horizontal stripe structure, the characteristic extraction unit 65 and the area setting unit 66 execute characteristic extraction processing and calculation area setting processing in a manner similar to that described above along a second direction different from the first direction. It is desirable that the second direction extend at an angle equal to or greater than 45° relative to the first direction and the second direction usually extends at an angle of 90° relative to the first direction. The embodiment is described by assuming that the second direction extends along the longitudinal direction (column direction).

The characteristic extraction unit 65 calculates the difference between brightness levels at pixels along the second direction (longitudinal direction), i.e., contrast manifesting along the second direction, in the two-dimensional image generated by the two-dimensional image generation unit 64. FIG. 8B shows the contrast Cv (i, j) manifesting at the subject pixel relative to the pixel adjacent to it along the longitudinal direction of the two-dimensional image V(i, j) in FIG. 7C, which is determined as indicated in (2) below and classified in to one of the four different contrast levels shown in FIG. 8E.

$$Cv(i,j) = |V(i,j) - V(i,j+1)| \quad (2)$$

The filled areas in FIG. 8B each represent a "characteristic point" in the two-dimensional image V (i, j) shown in FIG. 7C, present at a pixel with contrast Cv (i, j) thereof equal to or greater than a predetermined value Cvo=30.

The area setting unit 66 selects three characteristic points (or a single characteristic point or two characteristic points) close to the selected focus detection area (indicated by the filled dot in the figure) among the plurality of filled characteristic points in FIG. 8B and sets a calculation area centered on the selected characteristic points. FIG. 9B shows an example of a calculation area set around the three characteristic points (filled pixels) close to the focus detection area indicated by the filled dot.

Generally speaking, it is desirable to set a calculation area which is elongated along the second direction, i.e., a longitudinal (column) direction. In the calculation area shown in FIG. 9B, seven characteristic points are present along the second direction (longitudinal direction) and, accordingly, it is desirable to detect the image shift along this direction. It is to be noted that the contrast changes significantly along diagonal directions with angles of inclination up to 45° relative to the second direction and thus, a calculation area may be set along a 45° angle diagonal direction relative to the second direction or along a diagonal direction with the angle of inclination thereof within a range of 0 through 45°.

Figure 9D:
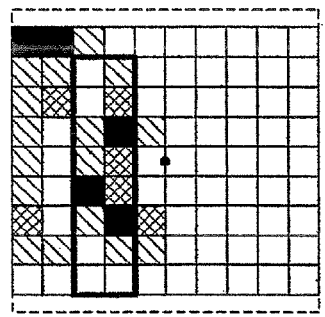

FIG. 8B presents an example in which characteristic points are present near a specific position indicated by the filled dot, i.e., near the selected focus detection area in this case. If characteristic points are present at positions slightly distanced from the focus detection area, as in the example presented in FIG. 8D, the area setting unit 66 may set a calculation area as shown in FIG. 9D. Through the processing described above, a calculation area centered on a high contrast image portion in the image can be set along the second direction (longitudinal direction), as well. Furthermore, the characteristic extraction unit 65 may execute characteristic extraction processing in a manner similar to that described above along both the first direction and the second direction. The area setting unit 66 can select the direction, which includes more characteristic points, among the first direction and the second direction, and set calculation area along the selected direction.

It is to be noted that while the characteristic extraction is executed and the calculation area is set along two different directions, i.e., the first direction and the second direction, by the characteristic extraction unit 65 and the area setting unit 66 in the example explained above, contrast may be detected and characteristic points may be extracted without setting specific directions so as to set a calculation area ranging along a plurality of directions, which contains the characteristic points. In such a case, C (i, j) indicating the contrast manifested by adjacent pixels may be determined as expressed below.

$$C(i,j)=|V(i,j)-V(i+1,j)|+|V(i,j)-V(i,j+1)| \quad (3)$$

The characteristic point extraction unit 65 compares the calculated contrast C (i, j) with a predetermined value Co (=30) and designates a pixel with the contrast value thereof equal to or greater than the predetermined value Co as a characteristic point.

(Image Signal Extraction Unit 67)

Figure 10:
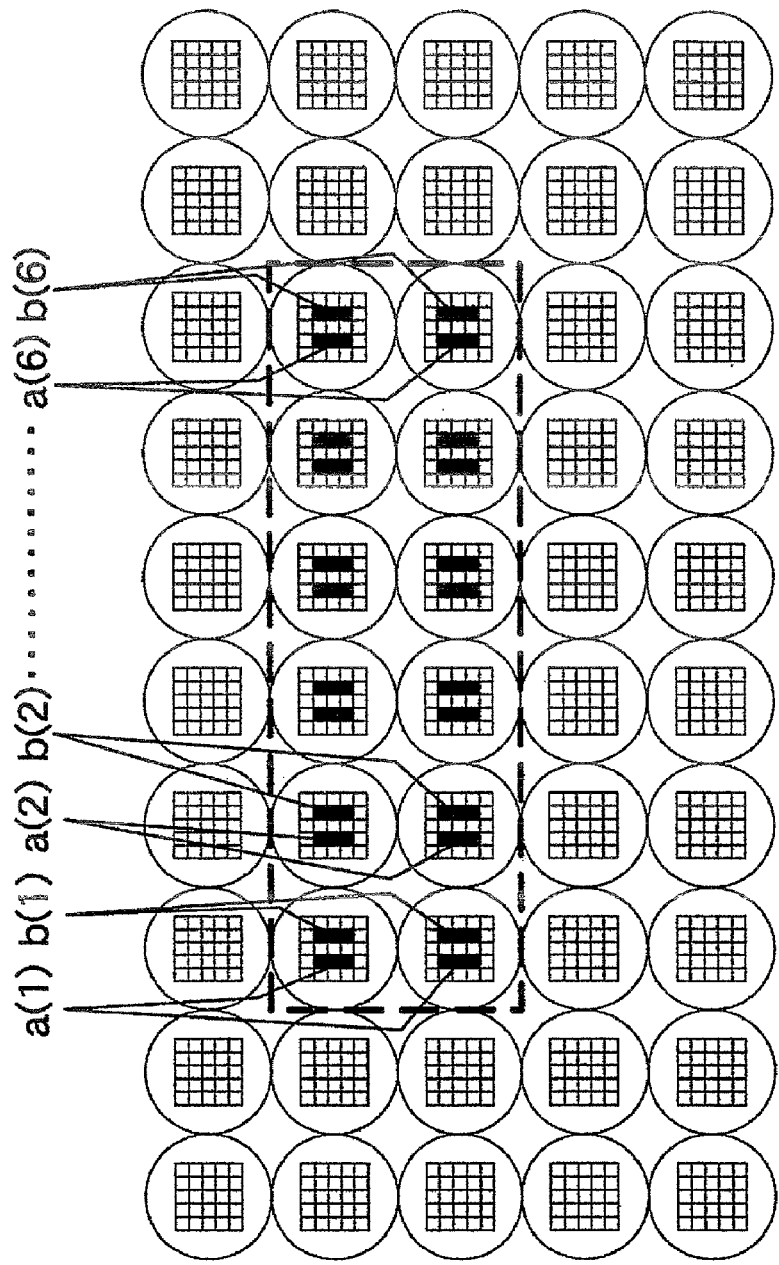
FIG. 10 shows a focus detection area in an enlargement.
Figure 11:
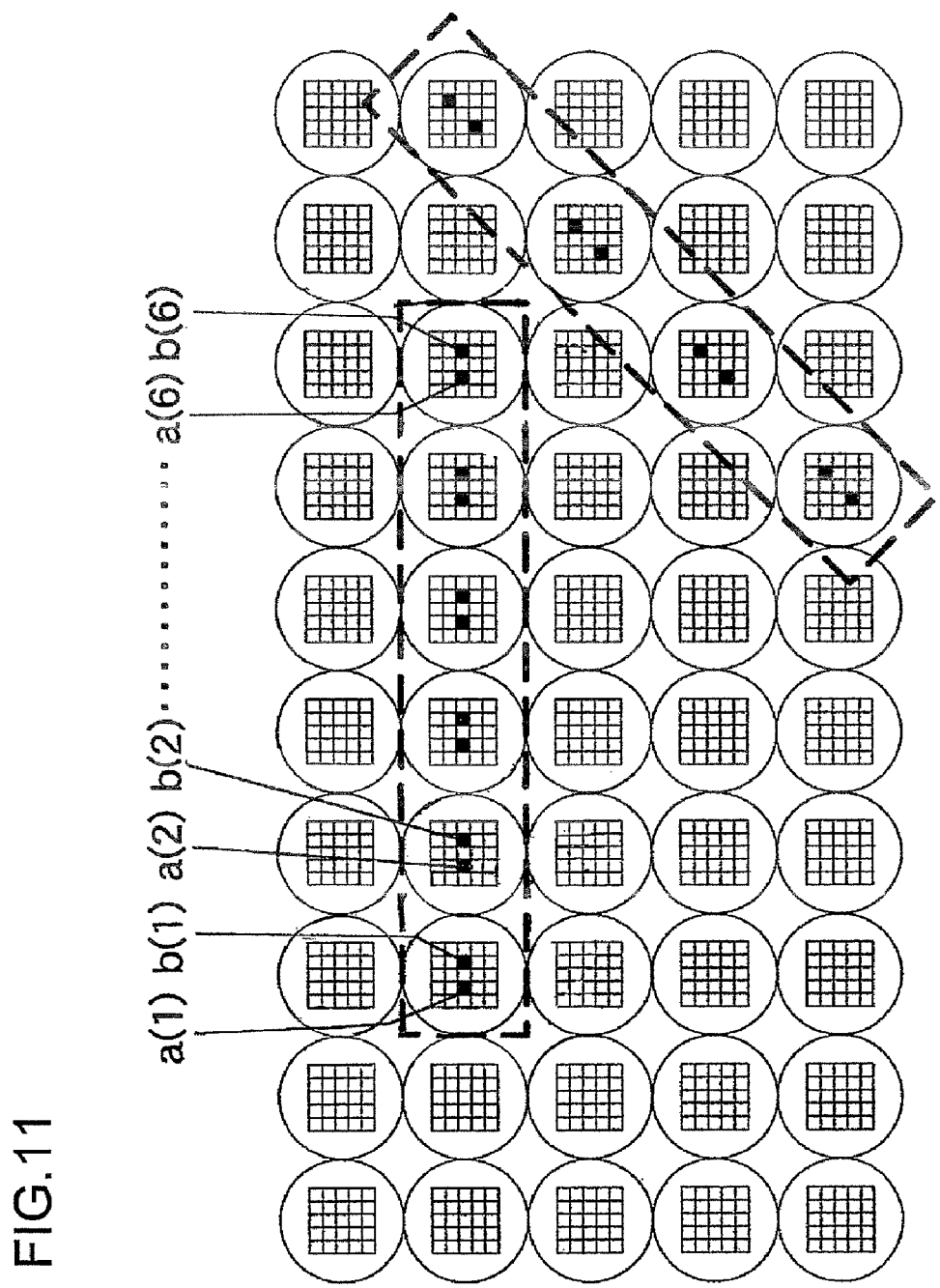
FIG. 11 shows a focus detection area in an enlargement.

FIG. 10 is an enlarged view of the calculation area in FIG. 9A. The longer side of the calculation area, along which the image shift is detected, should assume an optimal value. While FIGS. 9A and 10 presents an example in which two rows of pixels are selected as the calculation area, the calculation area may be made up with a single pixel row, as shown in FIG. 11 instead. Alternatively, a calculation area made up with three or more pixel rows may be selected. Based upon signals output from the plurality of image forming elements corresponding to the micro lenses present within the calculation area, focus detection signals indicating the extent of shift of the images formed with a pair of light fluxes having passed through different pupil areas at the photographic lens 23, i.e., a pair of focus detection signal strings, are generated.

In FIGS. 10 and 11, the image signal extraction unit 67 extracts a pair of signal strings to be used for focus detection, i.e., a first signal string (a (i)) and a second signal string (b (i)) (i=1, 2, 3, . . . ) from the outputs from the filled light-receiving elements disposed under the micro lenses.

First signal string$(a(i))=a(1),a(2),a(3)$.

Second signal string$(b(i))=b(1),b(2),b(3)$. $\quad (4)$

It is to be noted that a signal in each signal string is generated in the example presented in FIG. 10 by adding the outputs from three light-receiving elements disposed under a given micro-lens and then adding up the sums of light-receiving element outputs corresponding to one of the two rows, i.e., the upper row and the lower row. If the calculation area is set along a 45° angle diagonal direction, the signal strings should be generated by selecting focus detection pixels, as shown in FIG. 11.

(Image Shift Calculation Unit 68)

The image shift calculation unit 68 calculates the image shift quantity indicating the extent of image shift through image shift calculation of the known art executed by using the first signal string (a (i)) and the second signal string (b (i)). First, it determines a correlation quantity C(N) indicating the level of correlation between the pair of images (signal strings) based upon the first signal string (a (i)) and the second signal string (b (i)).

$$C(N)=\Sigma|a(i)-b(j)| \quad (5)$$

In expression (5), j−i=N (number of shifts) and Σ indicates a summation operation with qL representing the upper base and pL representing the lower base.

The image shift calculation unit 68 determines a shift quantity based upon discrete correlation quantities C(N) calculated as expressed in (5). Among the correlation quantities C(N) having been calculated, the correlation quantity that provides the smallest value when the shift quantity is N is indicated by Co, the correlation quantity corresponding to the shift quantity (N−1) is indicated by Cr and the correlation quantity corresponding to the shift quantity (N+1) is indicated by Cf. Based upon the relationship among the three correlation quantities Cr, Co and Cf, an accurate shift quantity Na is determined as expressed below.

$$DL=0.5\times(Cr-Cf)$$

$$E=\max(Vf-Co,Cr-Co)$$

$$Na=N+DL/E \quad (6)$$

The image shift calculation unit 68 adds a correction quantity (constant; const), corresponding to the position at the focus detection plane to the calculated shift quantity Na and thus determines an image shift quantity Δn indicating the extent of image shift manifesting on the focus detection plane.

$$\Delta n=Na+const \quad (7)$$

(Defocus Amount Calculation Unit 69)

The defocus amount calculation unit 69 calculates the defocus amount Df based upon the image shift quantity Δn as expressed below by using a constant Kf determined in conformance to the angle formed by the principal ray entering from a pupil used for detection, i.e., in conformance to a detection opening angle.

$$Df=Kf\times\Delta n \quad (8)$$

(Method Adopted when Setting the Calculation Area in Correspondence to Subject Movement)

When focus detection is executed multiple times in succession, the subject image may become displaced relative to the initially set calculation area as the subject moves. Under such circumstances, the following method may be adopted to keep tracking the initial detected portion of target subject at a calculation area. For instance, the two-dimensional image shown in FIG. 12A may be obtained through the initial focus detection and the two-dimensional image shown in FIG. 12B may be obtained through the following focus detection, i.e., the second focus detection.

While the subject movement may be tracked by using an image V1 (i, j) obtained at a time point t=t1 and an image V2 (i, j) obtained at a time point t=t2, the contrast Ch (i, j) indicating the contrast between adjacent pixels along the first direction (lateral direction) or the contrast Cv (i, j) manifesting between adjacent pixels along the second direction (longitudinal direction) may be used instead. Alternatively, contrast C (i, j) indicating the level of contrast between adjacent pixels manifesting along a plurality of directions (e.g., Ch (i, j)+Cv (i, j)) may be used.

An explanation is given in reference to the embodiment on an example in which the contrast C1 (i, j) ascertained at the time point t=t1 and the contrast C2 (i, j) ascertained at the time point t=t2 among the contrast values C (i, j) indicating contrast levels between adjacent pixels along a plurality of directions are used. Since a contrast distribution that may be represented by the sum of FIG. 8A and FIG. 8B is already available with regard to the image C1 (i, j) having already been detected, a comparison area is set based upon this contrast distribution. Since a square area will be easier to handle, the comparison area is set over a range defined by, for instance, the 7×6 pixel frame shown in FIG. 12C so as to contain at least a predetermined number of characteristic points present in the vicinity of the specific position mentioned earlier.

Since a certain degree of flexibility is afforded with regard to how the comparison area may be set, the comparison area may be set over a specific range containing as many characteristic points as possible or through another method, instead of the method described above whereby the range is determined so as to contain the predetermined number of characteristic points. A correlation quantity D (p, q) is then determined as expressed below by comparing the contrast C1 $(i, j)$ over the n×m pixel range (is1≦i1is1+n−1, js1≦j1≦js1+m−1) with the contrast C2 $(i, j)$ over the n×m pixel range (is 2≦i2 is 2+n−1, js2≦j2≦js2+m−1) newly detected at the time point t=t2.

$$D(p,q)=\Sigma|C1(i1,j1)-C2(i2,j2)| is2=is1+p, js2=js1+q, j2=i1+p, j2=j1+q \qquad (9)$$

The additions in expression (9) are executed over the range (is1≦i3 is1+n−1, js1≦j1≦js1+m−1).

Next, (p, q), at which the correlation quantity D (p, q) assumes the minimum value is determined by adjusting (p, q). (p, q), at which the correlation quantity D (p, q) assumes the minimum value represents a vector indicating the extent and direction of the shift. The characteristic extraction unit 65 and the area setting unit 66 set the calculation area at a position offset by the extent and along the direction indicated by the vector (p, q). In the situation illustrated in FIGS. 12C and 12D, (p, q)=(0, 2) and accordingly, the new calculation area is set at the position offset by two pixels along the downward direction. Since the processing executed after setting the calculation area is identical to the processing explained earlier, its explanation is omitted.

(Method Adopted for Fine Image Extraction)

Figure 13A:
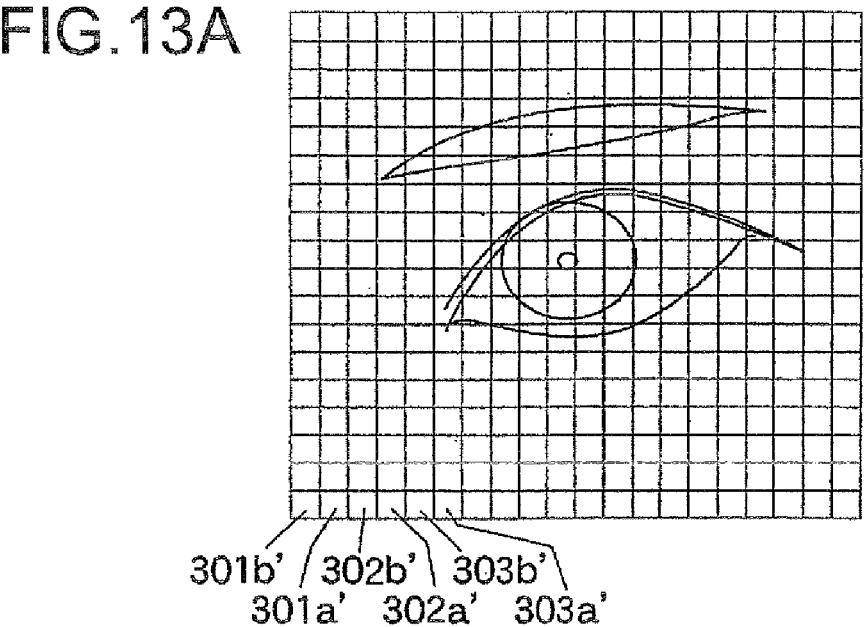
FIGS. 13A and 13B illustrate a method of fine two-dimensional image extraction.
Figure 13B:
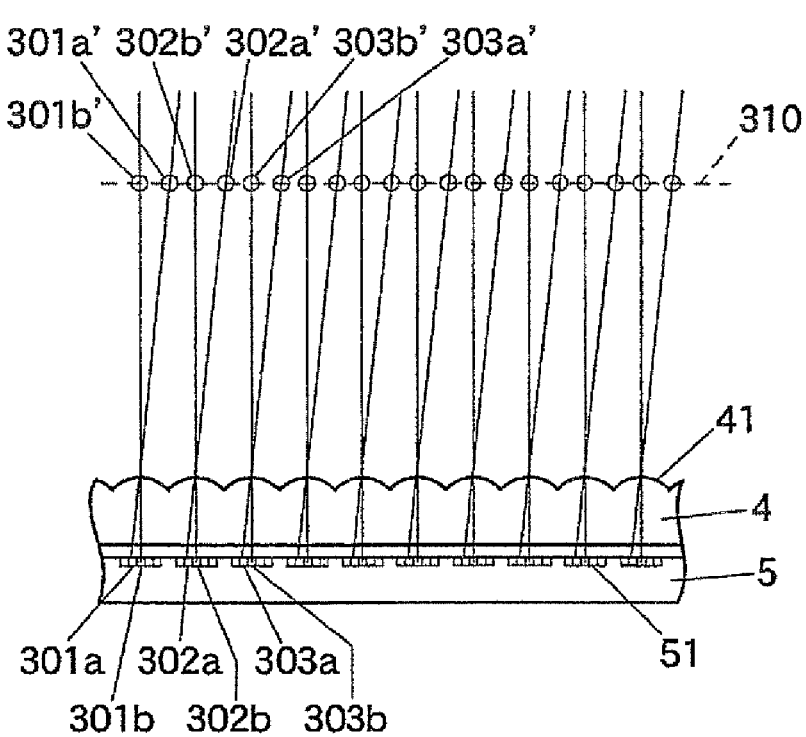

While FIG. 4 presents an example in which a two-dimensional image is generated by extracting the output from a single light-receiving element in correspondence to each micro-lens, a finer two-dimensional image can be extracted through the following method. FIG. 13B provides a sectional view of a focus detection optical system (micro-lens array) 4 and a focus detection sensor 5 identical to those in FIG. 4C. The image signal extraction unit 67 extracts the outputs from a total of four light-receiving elements, i.e., two light-receiving elements (across) by two light-receiving elements (down) in the vicinity of the center of each micro-lens without adding the outputs together and then generates the two-dimensional image shown in FIG. 13A by arranging the outputs from the four light-receiving elements extracted in correspondence to each micro-lens. At this time, the outputs from the four light-receiving elements from a given micro-lens are arranged by reversing the order in which the outputs from the four light-receiving elements have been obtained.

Figure 7D:
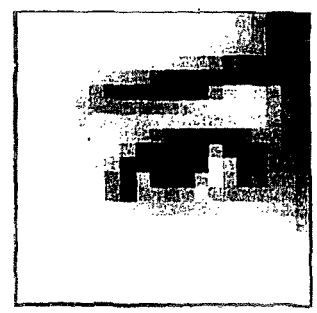

Assuming that the light-receiving elements are disposed at the focus detection sensor (light-receiving element array) 5 in the order of; 301a, 301b, 302a, 302b, 303a, 303b, ... in FIG. 13B, the light-receiving element outputs are set on a two-dimensional image composite plane 310 in the order of; 301b', 301a', 302b', 302a', 303b' 303a', .... In other words, the light-receiving element outputs from the light-receiving elements belonging to a given micro-lens are set by reversing the order in which the light-receiving elements are disposed on the focus detection sensor 5. By generating a two-dimensional image such as that shown in FIG. 13A, as described above, a very fine image is formed near the two-dimensional image composite plane 310, enabling more accurate decision-making. While an image such as that shown in FIG. 7C is generated by extracting a single light-receiving element output in correspondence to each micro-lens, a fine image such as that shown in FIG. 7D is obtained near the image composite plane 310 by extracting four light-receiving element outputs in correspondence to each micro-lens.

As described above, the micro-lens array constituted with a plurality of two-dimensionally arrayed micro lenses and the light-receiving element array that includes a plurality of light-receiving elements disposed in correspondence to each micro-lens and receives a light flux from the image forming optical system via the micro lenses are used, image information and focus detection signals indicating the focal adjustment state of the image forming optical system, which are different from the image information, are generated based upon the signals output from the light-receiving elements in the light-receiving element array and the focal adjustment state of the image forming optical system is detected based upon the image information and the focus detection signals in the embodiment. Since the focus detection is executed for the image forming optical system based upon the image information and the focus detection signals, the optimal focus detection position can be selected from all the selectable positions.

As described above, it is difficult to capture a high contrast portion of the focusing target subject over a calculation area at a focus detection device having sparsely set calculation areas assuming a small width. In the embodiment, focus detection for the image forming optical system is executed by utilizing a micro-lens array and a light-receiving element array, making it possible to set a calculation area at any position within the photographic image plane of the image forming optical system, which, in turn, assures a high level of freedom in the calculation area setting. While the high level of freedom afforded with regard to calculation area setting makes it even more crucial to select the optimal calculation area, the operation for setting the calculation area is bound to be complicated if it is to be manually performed by the photographer. Accordingly, the image information, i.e., two-dimensional image data, is obtained from the light reception output from the light-receiving element array as well as the focus detection signals so as to execute focus detection based upon the image information and the focus detection signals in the embodiment. As a result, selection of the optimal calculation area is enabled at a focus detection device assuming a simple structure, based upon the light reception output from the light-receiving element array and highly accurate focus detection is enabled by capturing a high contrast portion of the focusing target subject over the calculation area.

In the embodiment, a characteristic feature of the image is detected based upon the image information and the calculation area is set at a position within the image plane equivalent to the position at which the characteristic feature is detected. For instance, the contrast may be detected based upon the image information and the calculation area is set at a position where the contrast may be represented by a value equal to or greater than a predetermined value. Since this allows the calculation area to be set at the position corresponding to the high contrast portion of the focusing target subject, highly accurate focus detection is enabled.

The above described embodiment is an example, and various modifications can be made without departing from the scope of the invention.

What is claimed is:

1. A focus detection device for an image forming optical system, comprising:
    a micro-lens array constituted with a plurality of two-dimensionally arrayed micro-lenses;
    a light-receiving element array that includes a plurality of light-receiving elements receiving a light flux from the image forming optical system via the micro-lenses, the plurality of light-receiving elements being two-dimensionally disposed in correspondence to each micro-lens and outputting signals;
    an area setting unit that sets at least one focus detection area within a photographic image plane of the image forming optical system;
    an image range setting unit that sets an image range in which the focus detection area is centered;

a contrast detection unit that detects a contrast of a subject image in the image range based upon the signals and outputs contrast information;

a focus detection region setting unit that sets a focus detection region in the image range based upon the contrast information, the focus detection region being smaller than the image range; and a focus detection unit that detects a focus adjustment state of the image forming optical system based upon the signals, the signals being output from the light-receiving elements within the focus detection region set by the region setting unit.

2. A focus detection device for an image forming optical system according to claim 1, wherein:

the focus detection unit detects the focus adjustment state of the image forming optical system by using a focus detection signal, the focus detection signal being the signals corresponding an extent of shift between images formed with a pair of light fluxes having passed through different portions of pupil at the image forming optical system.

3. A focus detection device for an image forming optical system according to claim 1, wherein:

the focus detection region setting unit sets the focus detection region at the position where the contrast of the subject image is represented by a value equal to or greater than a predetermined value.

4. A focus detection device for an image forming optical system according to claim 3, wherein:

the contrast detection unit detects the contrast of the subject image manifesting along a first direction in the image range; and the focus detection region setting unit sets the focus detection region at the position where the contrast of the subject image is represented by a value equal to or greater than the predetermined value.

5. A focus detection device for an image forming optical system according to claim 4, wherein:

the contrast detection unit detects the contrast of the subject image manifesting along a second direction different from the first direction in the image range; and the focus detection region setting unit sets the focus detection region at the position where the contrast of the subject image is represented by a value equal to or greater than the predetermined value.

6. A focus detection device for an image forming optical system according to claim 1, wherein:

after the contrast detection unit detects the contrast of the subject image in the image range at a first time point and outputs first contrast information, the contrast detection unit detects the contrast of the subject image at a second time point and outputs second contrast information; and the focus detection region setting unit adjusts the position of the focus detection region to a position at which the second contrast information contains characteristics identical to the characteristics of the first contrast information.

7. A focus detection device for an image forming optical system according to claim 1, wherein:

the contrast detection unit detects the contrast of the subject image by selectively using the signals obtained from the plurality of light-receiving elements corresponding to each micro-lens.

8. An imaging apparatus comprising:

an image sensor that receives a light flux from an image forming optical system;

a micro-lens array constituted with a plurality of two-dimensionally arrayed micro-lenses;

a light-receiving element array that includes a plurality of light-receiving elements receiving a light flux from the image forming optical system via the micro-lenses, the plurality of light-receiving elements being two-dimensionally disposed in correspondence to each micro-lens and outputting signals;

an area setting unit that sets at least one focus detection area within a photographic image plane of the image forming optical system;

an image range setting unit that sets an image range in which the focus detection area is centered;

a contrast detection unit that detects a contrast of a subject image in the image range based upon the signals and outputs contrast information;

a focus detection region setting unit that sets a focus detection region in the image range based upon the contrast information, the focus detection region being smaller than the image range; and a focus detection unit that detects a focus adjustment state of the image forming optical system based upon the signals, the signals being output from the light-receiving elements within the focus detection region set by the region setting unit.

9. A focus detection method for an image forming optical system, comprising:

providing a micro-lens array constituted with a plurality of two-dimensionally arrayed micro-lenses; and a light-receiving element array that includes a plurality of light-receiving elements receiving a light flux from the image forming optical system via the micro-lenses, the plurality of light-receiving elements being two-dimensionally disposed in correspondence to each micro-lens and outputting signals;

setting at least one focus detection area within a photographic image plane of the image forming optical system;

setting an image range in which the focus detection area is centered;

detecting a contrast of a subject image in the image range based upon the signals;

outputting contrast information;

setting a focus detection region in the image range based upon the contrast information, the focus detection region being smaller than the image range; and detecting a focus adjustment state of the image forming optical system based upon the signals, the signals being output from the light-receiving elements within the focus detection region set by the region setting unit.

10. A focus detection method according to claim 9, wherein the focus adjustment state of the image forming optical system is detected by using a focus detection signal, the focus detection signal being the signals corresponding an extent of shift between images formed with a pair of light fluxes having passed through different portions of pupil at the image forming optical system.

* * * * *